(12) United States Patent
Pick et al.

(10) Patent No.: US 12,057,971 B2
(45) Date of Patent: Aug. 6, 2024

(54) FREQUENCY-DOMAIN REFERENCE SIGNAL BLOCK WITH A TIME-DOMAIN SINGLE CARRIER WAVEFORM DATA TRANSMISSION

(71) Applicant: QUALCOMM Incorporated, San Diego, CA (US)

(72) Inventors: Jacob Pick, Beit Zait (IL); Shay Landis, Hod Hasharon (IL); Amit Bar-Or Tillinger, Tel-Aviv (IL); Yehonatan Dallal, Kfar Saba (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/223,820

(22) Filed: Apr. 6, 2021

(65) Prior Publication Data

US 2022/0321386 A1    Oct. 6, 2022

(51) Int. Cl.
*H04L 25/02* (2006.01)
*H04L 5/00* (2006.01)
*H04W 72/0446* (2023.01)

(52) U.S. Cl.
CPC ........ *H04L 25/0224* (2013.01); *H04L 5/0048* (2013.01); *H04W 72/0446* (2013.01); *H04L 5/0007* (2013.01)

(58) Field of Classification Search
CPC .................................. H04L 27/00; H04B 7/00
See application file for complete search history.

(56) References Cited

U.S. PATENT DOCUMENTS

| 10,587,366 | B2 | 3/2020 | Chervyakov et al. |
| 10,756,869 | B2 | 8/2020 | Khoryaev et al. |
| 11,128,418 | B2* | 9/2021 | Tang ............... H04L 5/0007 |
| 2007/0036179 | A1* | 2/2007 | Palanki .............. H04L 25/022 370/208 |
| 2007/0248113 | A1* | 10/2007 | Ko .................... H04B 7/0613 370/208 |
| 2009/0041150 | A1* | 2/2009 | Tsai ................... H04B 7/0632 343/893 |
| 2010/0008436 | A1* | 1/2010 | Zhang .............. H04L 27/2602 375/260 |
| 2013/0343477 | A9 | 12/2013 | Jia et al. |
| 2014/0348012 | A1* | 11/2014 | Wu .................... H04L 5/0094 370/252 |

(Continued)

OTHER PUBLICATIONS

International Search Report and Written Opinion—PCT/US2022/070861—ISA/EPO—Jun. 13, 2022.

(Continued)

*Primary Examiner* — Zhiren Qin
(74) *Attorney, Agent, or Firm* — Sevan Savsa; Harrity & Harrity, LLP

(57) ABSTRACT

Various aspects of the present disclosure generally relate to wireless communication. In some aspects, a user equipment (UE) may receive, from a transmitter, a reference signal block provided based at least in part on an orthogonal frequency division multiplexing (OFDM) waveform. The UE may perform an estimation operation based at least in part on the reference signal block. The UE may receive a data transmission via a single carrier waveform based at least in part on the estimation operation. Numerous other aspects are provided.

30 Claims, 10 Drawing Sheets

(56) References Cited

U.S. PATENT DOCUMENTS

| | | | | |
|---|---|---|---|---|
| 2014/0362766 A1* | 12/2014 | Strait | ............... | H04L 25/03968 |
| | | | | 370/328 |
| 2016/0050094 A1* | 2/2016 | Ryu | ................... | H04L 27/2697 |
| | | | | 370/329 |
| 2019/0215123 A1* | 7/2019 | Zhou | ..................... | H04W 72/30 |
| 2021/0337549 A1* | 10/2021 | Zhang | .................. | H04L 5/0048 |
| 2022/0183013 A1 | 6/2022 | Pick et al. | | |

OTHER PUBLICATIONS

ZTE Corporation: "Discussion on Potential Techniques for PUSCH", R1-2005427, 3GPP TSG RAN WG1 #102-e, 3rd Generation Partnership Project , Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020, XP051917452, pp. 1-7.

* cited by examiner

FREQUENCY-DOMAIN REFERENCE SIGNAL BLOCK WITH A TIME-DOMAIN SINGLE CARRIER WAVEFORM DATA TRANSMISSION

FIELD OF THE DISCLOSURE

Aspects of the present disclosure generally relate to wireless communication and to techniques and apparatuses for providing a frequency-domain reference signal block with a time-domain single carrier waveform data transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a transmitter, a reference signal block provided based at least in part on an orthogonal frequency division multiplexing (OFDM) waveform; performing an estimation operation based at least in part on the reference signal block; and receiving a data transmission via a single carrier waveform based at least in part on the estimation operation.

In some aspects, a method of wireless communication performed by a transmitter includes transmitting a reference signal block provided based at least in part on an OFDM waveform, wherein the reference signal block comprises a plurality of reference signals in a plurality of corresponding resource elements; and transmitting a data transmission via a single carrier waveform.

In some aspects, a UE for wireless communication includes a memory; and one or more processors operatively coupled to the memory, the memory and the one or more processors configured to: receive, from a transmitter, a reference signal block provided based at least in part on an OFDM waveform; perform an estimation operation based at least in part on the reference signal block; and receive a data transmission via a single carrier waveform based at least in part on the estimation operation.

In some aspects, a transmitter for wireless communication includes a memory; and one or more processors operatively coupled to the memory, the memory and the one or more processors configured to: transmit a reference signal block provided based at least in part on an OFDM waveform, wherein the reference signal block comprises a plurality of reference signals in a plurality of corresponding resource elements; and transmit a data transmission via a single carrier waveform.

In some aspects, a non-transitory computer-readable medium storing a set of instructions for wireless communication includes one or more instructions that, when executed by one or more processors of a UE, cause the UE to: receive, from a transmitter, a reference signal block provided based at least in part on an OFDM waveform; perform an estimation operation based at least in part on the reference signal block; and receive a data transmission via a single carrier waveform based at least in part on the estimation operation.

In some aspects, a non-transitory computer-readable medium storing a set of instructions for wireless communication includes one or more instructions that, when executed by one or more processors of a transmitter, cause the transmitter to: transmit a reference signal block provided based at least in part on an OFDM waveform, wherein the reference signal block comprises a plurality of reference signals in a plurality of corresponding resource elements; and transmit a data transmission via a single carrier waveform.

In some aspects, an apparatus for wireless communication includes means for receiving, from a transmitter, a reference signal block provided based at least in part on an OFDM waveform; means for performing an estimation operation based at least in part on the reference signal block; and means for receiving a data transmission via a single carrier waveform based at least in part on the estimation operation.

In some aspects, an apparatus for wireless communication includes means for transmitting a reference signal block provided based at least in part on an OFDM waveform, wherein the reference signal block comprises a plurality of reference signals in a plurality of corresponding resource elements; and means for transmitting a data transmission via a single carrier waveform.

Aspects generally include a method, apparatus, system, computer program product, non-transitory computer-readable medium, UE, base station, transmitter, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
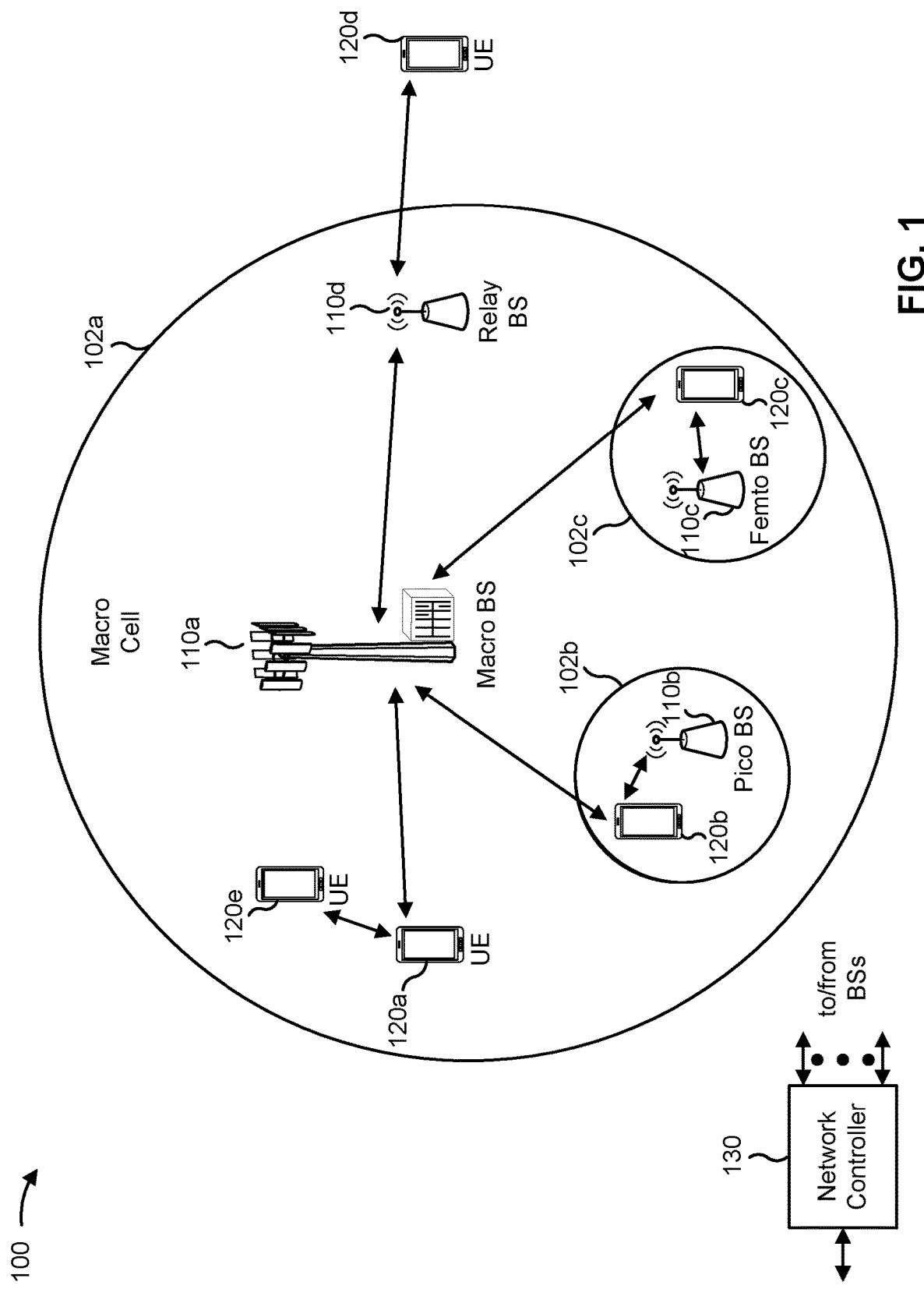
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies or as a third frequency range (FR3). Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). In some aspects, devices of wireless network 100 may communicate using an operating band having a fourth frequency range (FR4), which may span from approximately 52 GHz to 115 GHz. The devices of wireless network 100 may also communicate using an operating band having frequencies higher than the fourth frequency range. It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
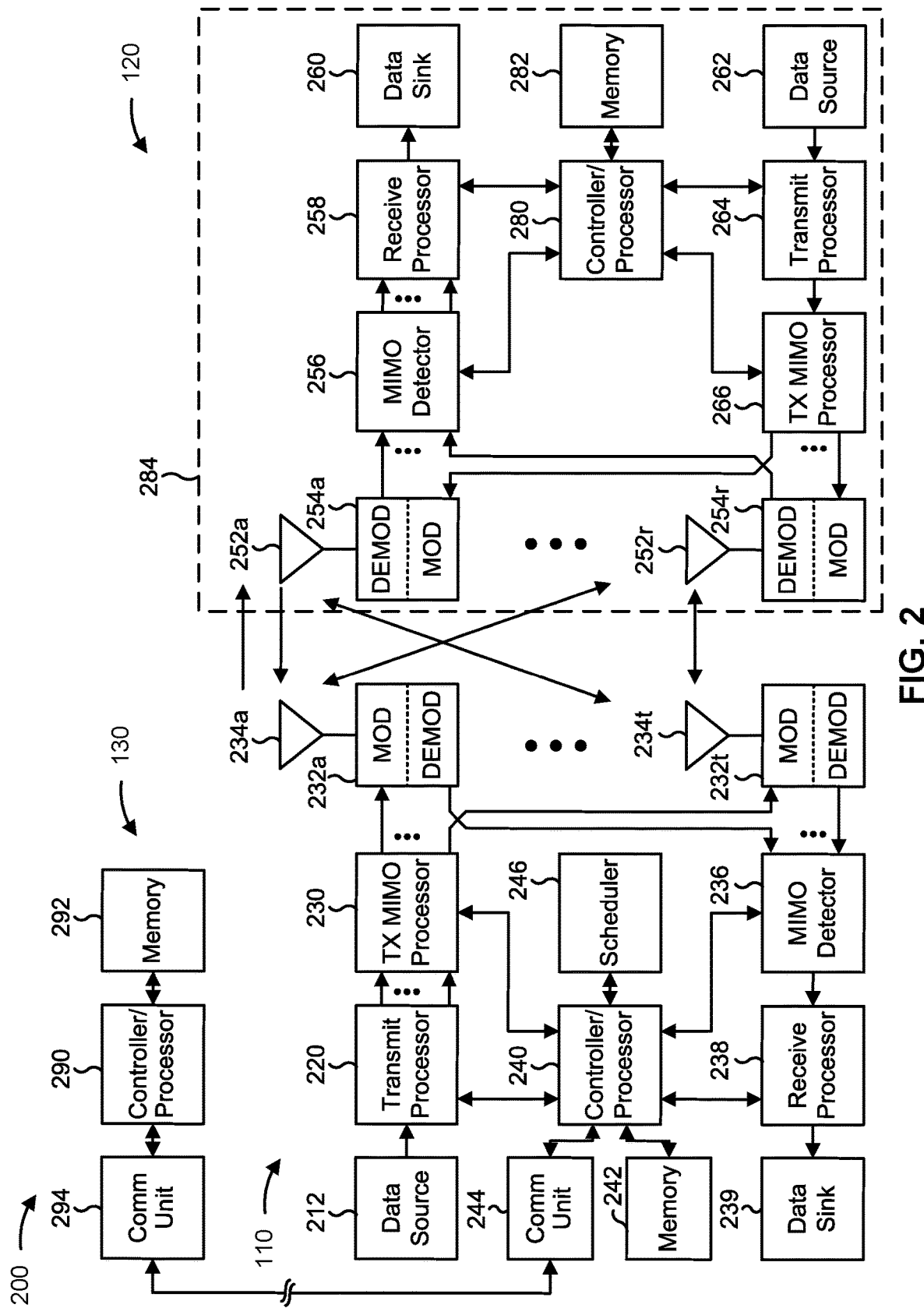
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with providing a frequency-domain reference signal block with a time-domain single carrier waveform, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, UE 120 may include means for receiving, from a transmitter, a reference signal block provided based at least in part on an orthogonal frequency division multiplexing (OFDM) waveform, means for performing an estimation operation based at least in part on the reference signal block, means for receiving a data transmission via a single carrier waveform based at least in part on the estimation operation, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a transmitter (e.g., base station 110) may include means for transmitting a reference signal block provided based at least in part on an orthogonal frequency division multiplexing (OFDM) waveform, wherein the reference signal block comprises a plurality of reference signals in a plurality of corresponding resource elements, means for transmitting a data transmission via a single carrier waveform, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may conduct data communication with a BS via a wireless network such as an LTE network or a 5G/NR network. In the data communication, the UE may receive signaling data (e.g., channel estimation information and/or beam pair information, such as reference signals) and/or payload data (e.g., audio data, video data, data communications or content) from the BS.

The UE may receive the signaling data and/or the payload data over a channel via one or more beam pairs. A beam pair may include, for example, a transmission beam used by the BS to transmit data and a reception beam used by the UE to receive transmitted data on the downlink, or a transmission beam used by the UE to transmit data and a reception beam used by the BS to receive transmitted data on the uplink. A transmission beam may be referred to as a transmit beam and a reception beam may be referred to as a receive beam. Generally, a beam may be generated by applying a spatial filter with regard to a set of antenna ports so that radiated energy is directed in a particular fashion, or so that reception is associated with a particular direction or spatial region.

The UE may use the channel estimation information received in the signaling data to estimate a condition associated with the channel (e.g., channel estimation) and use the beam pair information received in the signaling data to estimate a pairing of a reception beam with a transmission beam to receive the transmitted data (e.g., beam pairing). For example, the channel estimation information and/or the beam pair information may include one or more reference signals.

The UE may utilize frequency-domain OFDM waveforms and/or time-domain single carrier waveforms to receive the signaling data and/or the payload data. In a frequency-domain OFDM waveform, multiple orthogonal subcarrier signals with overlapping spectra are transmitted to carry data in parallel. In a single-carrier waveform, multiple symbols in the frequency domain are transformed to and transmitted in the time domain on a single carrier, with the information of each symbol being spread across the entire frequency band upon transmission. In some instances, utilization of the single carrier waveforms may be preferred over utilization of the OFDM waveforms. For example, by utilizing the single carrier waveforms, the UE may avoid performing power-consuming communication operations (e.g., Fast-Fourier Transform (FFT) calculations and inverse FFT (IFFT) calculations) used to process the OFDM waveforms. Also, by utilizing the single carrier waveforms, the UE may avoid including an ability (e.g., processing capacity) to perform the power-consuming communication operations, thereby reducing a cost associated with components (e.g., baseband components) of the UE.

While utilizing the single carrier waveforms, the UE may encounter inter-symbol interference during reception, thereby rendering the channel estimation and the beam pairing resource-intensive due to interference mitigation operations. Also, while utilizing the single carrier waveforms, the UE may receive a limited amount of signaling data because of encoding of the signaling in the time-domain, thereby rendering the channel estimation and the beam pairing time-consuming.

Various aspects of techniques and apparatuses described herein may provide a frequency-domain OFDM reference signal block (RS block) to receive signaling data while utilizing single carrier waveforms to receive payload data. For example, a UE may receive a reference signal block provided based at least in part on an OFDM waveform, perform an estimation operation based at least in part on the reference signal block, and receive a data transmission via a single carrier waveform based at least in part on the estimation operation.

The RS block may include a cyclic prefix and/or may enable encoding of the signaling data in the frequency domain. In some aspects, the cyclic prefix may serve as a guard interval to alleviate potential inter-symbol interference at the UE, thereby simplifying channel estimation and beam pairing. In some aspects, the encoding of the signaling data in the frequency domain may allow reception of an adequate amount of the channel estimation information for the UE to accurately estimate a channel condition over a longer period of time (e.g., a long-term channel condition, such as to facilitate communications across multiple slots, subframes, or frames). Also, by receiving an adequate amount of beam pairing information in a single RS block, the UE may pair multiple reception beams with multiple transmission beams, thereby rendering the beam pairing time-efficient. The encoding of the signaling data in the frequency domain may also allow the UE to utilize a simplified receiver design including, for example, a single-tap equalizer to receive the signaling data. Furthermore, the usage of the RS block may improve efficiency in higher frequency ranges (e.g., FR4, approximately 140 GHz, or the like), where throughput and power consumption are higher than in lower frequency ranges. For example, in the higher frequency ranges, concerns may tend to focus on power efficiency, rather than spectral efficiency, since baseband processing of the higher-throughput communications in higher frequency ranges is more burdensome than in lower frequency ranges.

Figure 3:
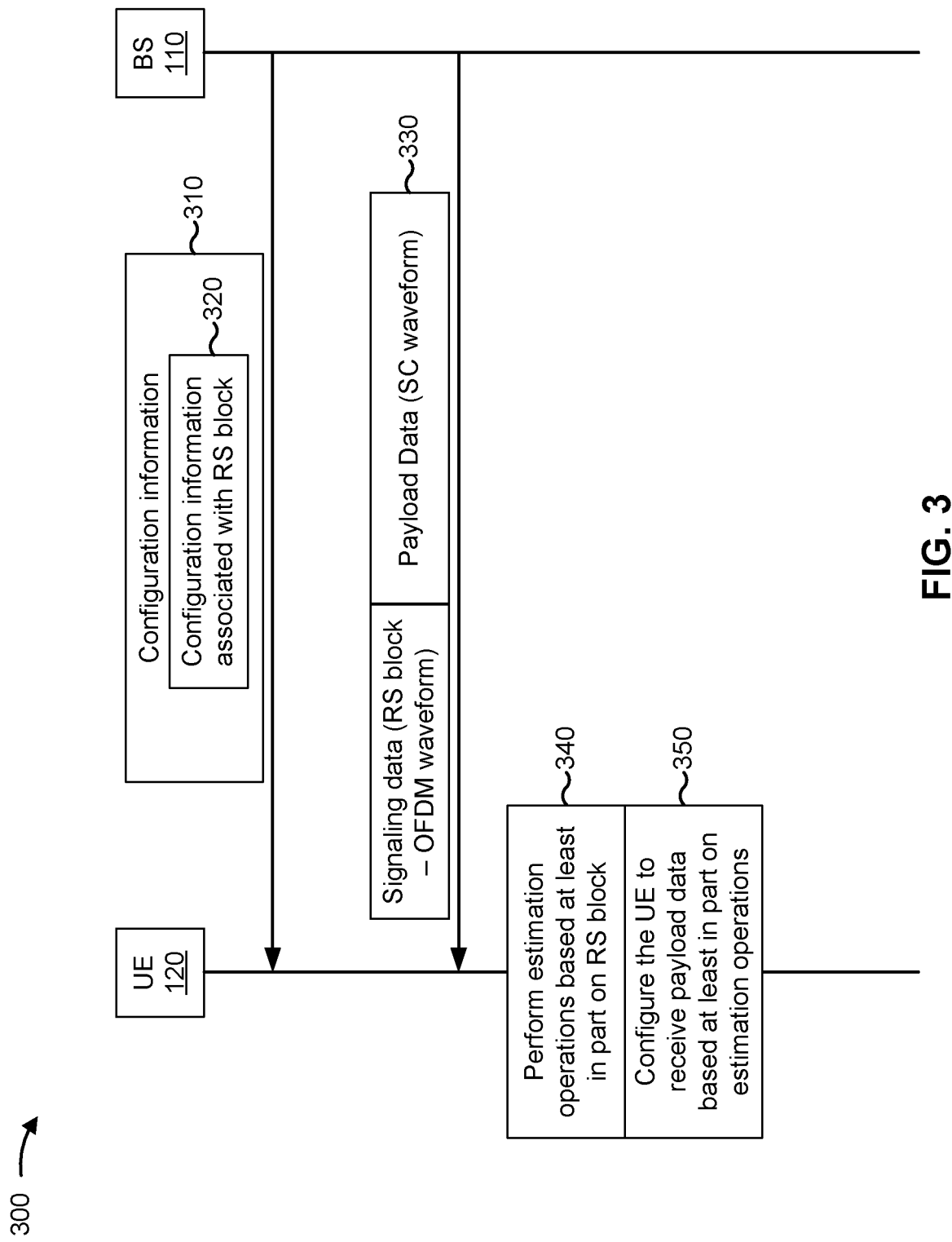
FIG. 3 is a diagram illustrating an example of data communication utilizing an OFDM reference signal block, in accordance with various aspects of the present disclosure.

FIG. 3 is a diagram illustrating an example 300 of data communication utilizing an OFDM reference signal block, in accordance with various aspects of the present disclosure. FIG. 3 shows a BS 110 and a UE 120 conducting data communication via a wireless network, such as an LTE network or a 5G/NR network. The data communication may include downlink communications from the BS 110 to the UE 120 and/or uplink communications from the UE 120 to the BS 110. The uplink and downlink communications may include, for example, signaling data and/or payload data.

As shown by reference number 310, the BS 110 may transmit, and the UE 120 may receive, configuration information at a beginning of or during the data communication. In some aspects, the UE 120 may receive the configuration information from another device (e.g., from another base station or another UE). In some aspects, the UE 120 may receive the configuration information via, for example, RRC signaling and/or medium access control (MAC) signaling (e.g., MAC control elements (MAC CEs)).

In some aspects, the configuration information may include an indication of, for example, one or more configuration parameters for the UE 120 to use to configure the UE 120 for the data communication. For instance, as shown by reference number 320, the configuration information may include configuration information associated with a reference signal block (RS block). In some aspects, the configuration information associated with the RS block may include, for example, a numerology indicating one or more parameters associated with the RS block. Such parameters may include, for example, a periodicity (T_RS) of the RS block indicating a periodic interval at which the RS block is received at the UE 120, a frequency width (SCS) indicating a subcarrier spacing used to transmit the RS block, a sequence length (N_RS) indicating a length of a pilot sequence included in the RS block or a sequence used to generate the RS block, a cyclic prefix (CP) length associated with the RS block, and/or the like.

As shown by reference number 330, to conduct the data communication, the BS 110 may transmit, and the UE 120 may receive, the signaling data via the RS block utilizing an OFDM waveform and the payload data utilizing a single carrier waveform. The signaling data may include channel estimation information and/or beam pair information (e.g., one or more reference signals or the like). The UE may use the channel estimation information to estimate a condition associated with the channel (e.g., channel estimation) and use the beam pair information to estimate a pairing of a reception beam with a transmission beam to receive the transmitted data (e.g., beam pairing).

In some aspects, frequency portions of the channel estimation information and/or the beam pair information may be encoded, as encoded channel estimation information and/or encoded beam pair information, in a single RS block, and may be represented by the following equation:

$$p\_t(k)=1/\sqrt{2}((1-2c\_t(2k))+j(1-2c\_t(2k+1))), \text{ wherein}$$

p_t(k) is a symbol associated with the RS block for a transmit antenna t at a frequency bin k, and c_t(k) is a Gold sequence for the transmit antenna t that is provided using an initialization defined by c_init (t, N_slot), with N_slot being a slot index. The frequency bin may be based at least in part on the frequency width of a subcarrier (e.g., 120 kHz, 480 kHz, 960 kHz, 1.92 MHz, 3.84 MHz, 7.68 MHz, 15.36 MHz, 30.72 MHz, and so on). The frequency width may also be referred to as a subcarrier spacing. In some aspects, a product of the frequency width and a symbol length may be a constant value. As such, a wider frequency width may result in a proportionately shorter symbol length and a shorter frequency width may result in a proportionately lengthier symbol.

As shown by reference number 340, the UE 120 may perform estimation operations based at least in part on the signaling data included in the RS block. In some aspects, the UE 120 may perform the estimation operations to estimate channel conditions to facilitate the data communication. For instance, the UE 120 may use the encoded channel estimation information, associated with a given transmit antenna t and a given frequency bin k, to perform the channel estimation. The channel estimation may include estimating, based at least in part on the encoded channel estimation information, a time-varying frequency response (e.g., fading) associated with the channel. In some aspects, the UE may use channel estimation information transmitted via an active transmitter antenna to perform the channel estimation. In some aspects, the UE 120 may use the encoded beam pairing information, associated with a given transmit antenna t and a given frequency bin k, to perform beam pairing. For example, as discussed in further detail with respect to FIG. 5, based at least in part on the encoded beam pairing information, the UE 120 may pair one or more reception beams to one or more transmission beams to receive the payload data.

In some aspects, based at least in part on other signaling data included in the RS block, the UE 120 may perform additional estimation operations to estimate one or more long-term parameters. Such estimation operations may include, for example, a timing estimation (e.g., estimation of a timing offset between a transmitter and a receiver, synchronization, or the like), a noise covariance estimation (e.g., estimation of a noise variance matrix or a noise covariance matrix at receive antenna(s) of a MIMO system, among other examples), a frequency-division residual sideband (FDRSB) estimation, a course frequency offset estimation, a rotation matrix estimation, an analog-to-digital (A/D) dynamic level estimation, and/or the like. The timing estimation may provide the UE 120 with timing information to synchronize with the BS 110. The noise covariance estimation may provide the UE 120 with information about a variance in an amount of noise observed over a channel used for the data communication. The FDRSB estimation may provide the UE 120 with an estimation of a signal self-image associated with a mixer of the transmitter. The course frequency offset estimation may provide the UE 120 with information about an offset between a carrier frequency at the BS 110 and a carrier frequency at the UE 120 (e.g., based at least in part on a number of frequency bin separations between an actual and measured location of a correlated peak), and may allow the UE 120 to adjust the offset to facilitate the data communication. The rotation matrix estimation may provide the UE 120 with information about obtaining potential performance gains to improve the data communication, such as based at least in part on an observed phase rotation associated with the channel. The A/D dynamic level estimation may provide the UE 120 with analog-to-digital encoding information to allow the UE to decode received data without degradation. In this way, the UE 120 may use signaling data included in a single RS block to estimate multiple long-term channel conditions.

As shown by reference number 350, based at least in part on the estimation operations, the UE 120 may configure the UE 120 to receive the payload data. For instance, with respect to the channel estimation, based at least in part on a characteristic of the estimated time-varying frequency response, the UE 120 may calculate an equalization response by, for example, inverting the characteristic of the estimated time-varying frequency response. The equalization response may enable the UE 120 to equalize the frequency portions of the channel estimation information, and to receive and decode the payload data. With respect to the beam pairing, based at least in part on results of the beam pairing operation, the UE 120 may pair a reception beam, associated with a receive antenna of the UE 120, with a transmission beam, associated with a transmit antenna of the BS 110, to receive the payload data transmitted by the transmit antenna over the transmission beam. Also, based at least in part on the additional estimation operations, the UE 120 may estimate the one or more long-term parameters to receive and decode the payload data. The payload data may be referred to as a data transmission, a data communication, or the like.

In this way, by receiving an adequate amount of beam pair information in a single RS block, the UE may efficiently perform the channel estimation and beam pairing operations. Also, because the UE 120 may accurately estimate multiple long-terms channel conditions, fewer transmissions of signaling data over a given period of time are used, thereby resulting in an increase in a throughput enabled by the UE 120 and an efficiency of the wireless network during the given period of time.

As indicated above, FIG. 3 is provided as an example. Other examples may differ from what is described with regard to FIG. 3.

Figure 4:
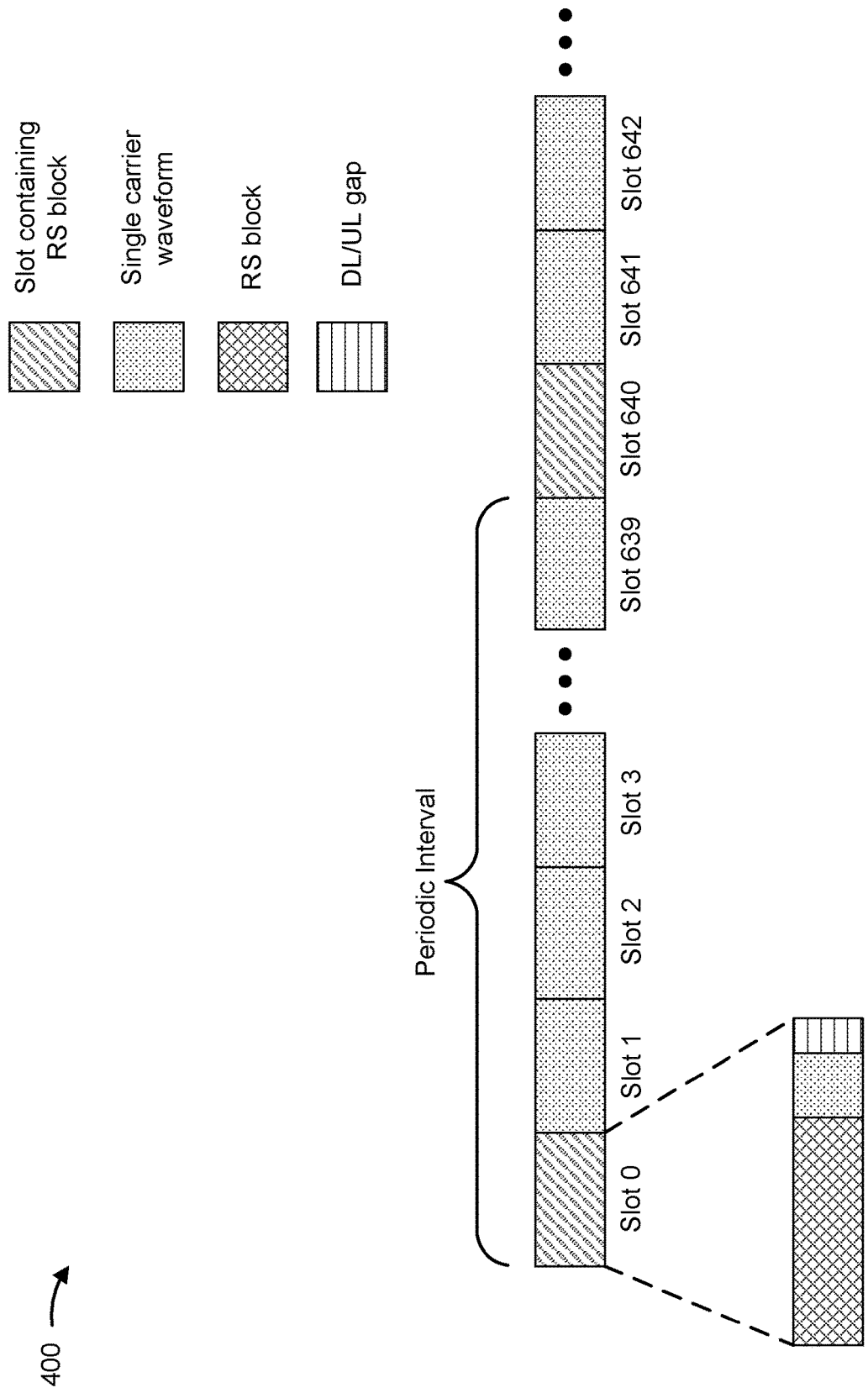
FIG. 4 is a diagram illustrating an example of data communication utilizing an OFDM reference signal block, in accordance with various aspects of the present disclosure.

FIG. 4 is a diagram illustrating an example 400 of data communication utilizing an OFDM reference signal block, in accordance with various aspects of the present disclosure. In some aspects, a BS 110 and a UE 120 may conduct a data communication, in a wireless network, by transmitting and/or receiving signaling data and/or payload data. For instance, during the data communication, the UE 120 may receive the signaling data utilizing a reference signal block (RS block) and may receive the payload data utilizing a single carrier waveform. The RS block may include, for example, one or more RS blocks discussed elsewhere herein, such as the RS block discussed above with respect to FIG. 3.

In some aspects, the BS 110 and the UE 120 may transmit and/or receive the signaling data and/or the payload data in one or more slots. A slot may contain any combination of, for example, the RS block including the signaling data, the single carrier waveform including the payload data, a reference signal separate from the RS block, and/or a DL/UL gap used, for example, to separate downlink and uplink communications. For instance, as shown in FIG. 4, a first slot (e.g., slot 0) received at the UE 120 during a first periodic interval may contain the RS block, data carried via the single carrier waveform, and the DL/UL gap. Additional slots (e.g., slot 1-slot 639) may include, for example, single carrier waveforms including additional payload data. The payload data may include any form of data or control transmission, and may not necessarily be encapsulated in a payload of, for example, a protocol data unit (PDU), a service data unit (SDU), or a packet.

In some aspects, as shown in FIG. 4, a first slot (e.g., slot 640) during a second periodic interval may also contain an RS block, a single carrier waveform including payload data, and a DL/UL gap. Additional slots (e.g., slot 641, slot 642, and so on) may be received during the second periodic interval and may contain, for example, single carrier waveforms including additional payload data.

In some aspects, the periodic interval may describe a periodicity associated with receiving the RS block. For example, as shown in FIG. 4, the UE 120 may receive the RS block at a beginning of every periodic interval. In some aspects, as discussed above with respect to FIG. 3, because the RS block includes adequate signaling data to allow the UE 120 to estimate multiple long-term channel conditions (e.g., for an entire duration of the periodic interval), the UE 120 may receive a single RS block during the periodic interval. In this way, receiving the single RS block may result in an increase in a throughput enabled by the UE 120 during the periodic interval and improve an efficiency of the wireless network. For example, the usage of the single RS block during the periodic interval may reduce overhead relative to transmitting RS blocks more frequently, such as RS blocks that convey less information regarding the channel. In example 400, the periodic interval is 10 ms, though other lengths of periodic interval may be used based at least in part on the configuration of the base station or the UE.

As indicated above, FIG. 4 is provided as an example. Other examples may differ from what is described with regard to FIG. 4.

Figure 5:
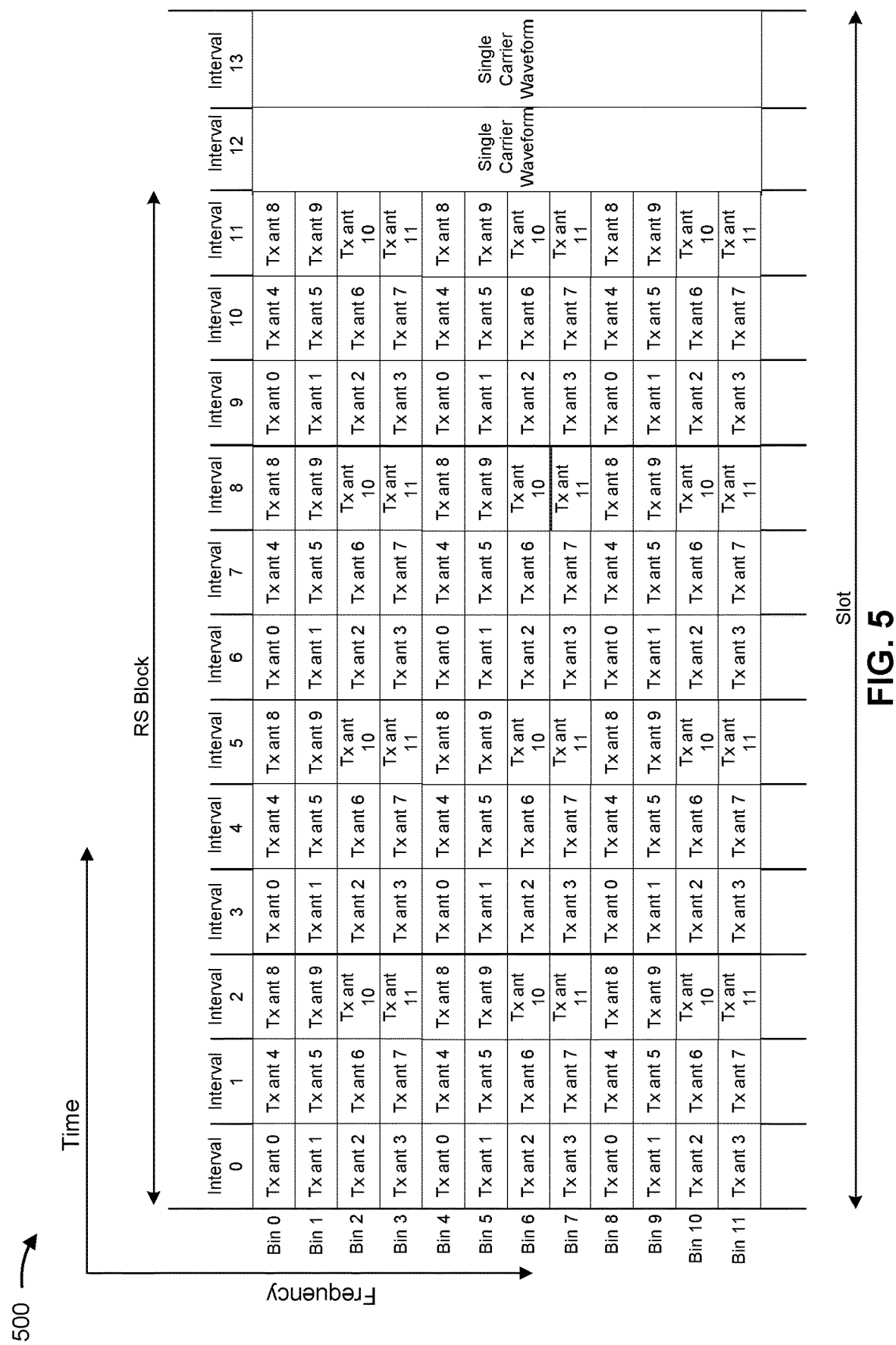
FIG. 5 is a diagram illustrating an example of data communication utilizing an OFDM reference signal block, in accordance with various aspects of the present disclosure.

FIG. 5 is a diagram illustrating an example of data communication utilizing an OFDM reference signal block, in accordance with various aspects of the present disclosure. A BS 110 and a UE 120 may conduct data communication, in a wireless network, by transmitting and/or receiving signaling data and/or payload data. In some aspects, the BS 110 may transmit, and the UE 120 may receive, the signaling data and/or the payload data utilizing one or more slots. A slot may contain any combination of, for example, a reference signal block (RS block) including the signaling data, a single carrier waveform including the payload data, and/or a DL/UL gap used, for example, to separate downlink and uplink communications. In some aspects, the UE 120 may receive a slot containing an RS block periodically (e.g., once within a periodic interval of time). The RS block may include, for example, one or more RS blocks discussed elsewhere herein, such as the RS block discussed above with respect to FIG. 3 and/or the RS block discussed above with respect to FIG. 4.

FIG. 5 shows an example of a slot containing an RS block including signaling data and payload data transmitted via a single carrier waveform. In some aspects, the BS 110 may include a plurality of transmit antennas (e.g., Tx ant 0, Tx ant 1, . . . , Tx ant 10, and Tx ant 11) to transmit data in the slot and the UE 120 may include a plurality of receive antennas (e.g., Rx ant 0, Rx ant 1, Rx ant 2, and Rx ant 3) to receive the data in the slot. In some aspects, the UE 120 may receive the RS block including symbols associated with a frequency-domain OFDM waveform (RS block symbols) and may receive the single carrier waveform as a time-domain waveform. While example 500 involves twelve transmit antennas and four receive antennas, these techniques can be applied for any number of transmit antennas and any number of receive antennas, for example, by varying the frequency comb associated with the RS block or the time-domain repetition scheme associated with the RS block.

As shown in FIG. 5, the RS block symbols and the single carrier waveform may be arranged in the slot with, for example, time charted along an x-axis and frequency charted along a y-axis. In some aspects, the time along the x-axis of the slot may be divided into, for example, fourteen time intervals (e.g., Interval 0, Interval 1, . . . , Interval 12, and Interval 13) and the frequency along the y-axis may be divided into, for example, 12 frequency bins (e.g., Bin 0, Bin 1, ..., Bin 10, and Bin 11). The UE 120 may receive the RS block symbols during a time span from Interval 0 to Interval 11 and may receive the single carrier waveform during a time span from Interval 12 to Interval 13.

The RS block symbols received during the time span from Interval 0 to Interval 11 may include symbols received from the plurality of transmit antennas of the BS 110. In some aspects, the UE 120 may receive the RS block symbols according to a pattern associated with a transmit antenna, a time interval, and/or a frequency bin. For instance, during Interval 0, the UE 120 may receive an RS block transmitted by Tx ant 0 at Bin 0, an RS block transmitted by Tx ant 1 at Bin 1, an RS symbol transmitted by Tx ant 2 at Bin 2, and an RS symbol transmitted by Tx ant 3 at Bin 3. Such a pattern may repeat during Interval 0 such that the UE 120 may receive an RS block transmitted by Tx ant 0 at Bin 4, an RS block transmitted by Tx ant 1 at Bin 5, an RS symbol transmitted by Tx ant 2 at Bin 6, and an RS symbol transmitted by Tx ant 3 at Bin 7. Again, during Interval 0, the UE 120 may receive an RS block transmitted by Tx ant 0 at Bin 8, an RS block transmitted by Tx ant 1 at Bin 9, an RS symbol transmitted by Tx ant 2 at Bin 10, and an RS symbol transmitted by Tx ant 3 at Bin 11.

In some aspects, a pattern similar to the above pattern during Interval 0 may be observed during other time intervals. For instance, during Interval 1, the UE 120 may receive an RS block transmitted by Tx ant 4 at Bin 0, an RS block transmitted by Tx ant 5 at Bin 1, an RS symbol transmitted by Tx ant 6 at Bin 2, and an RS symbol transmitted by Tx ant 7 at Bin 3. Such a pattern may repeat during Interval 1 such that the UE 120 may receive an RS block transmitted by Tx ant 4 at Bin 4, an RS block transmitted by Tx ant 5 at Bin 5, an RS symbol transmitted by Tx ant 6 at Bin 6, and an RS symbol transmitted by Tx ant 7 at Bin 7. Again, during Interval 1, the UE 120 may receive an RS block transmitted by Tx ant 4 at Bin 8, an RS block transmitted by Tx ant 5 at Bin 9, an RS symbol transmitted by Tx ant 6 at Bin 10, and an RS symbol transmitted by Tx ant 7 at Bin 11.

Also, during Interval 2, the UE 120 may receive an RS block transmitted by Tx ant 8 at Bin 0, an RS block transmitted by Tx ant 9 at Bin 1, an RS symbol transmitted by Tx ant 10 at Bin 2, and an RS symbol transmitted by Tx ant 11 at Bin 3. Such a pattern may repeat during Interval 2 such that the UE 120 may receive an RS block transmitted by Tx ant 8 at Bin 4, an RS block transmitted by Tx ant 9 at Bin 5, an RS symbol transmitted by Tx ant 10 at Bin 6, and an RS symbol transmitted by Tx ant 11 at Bin 7. Again, during Interval 2, the UE 120 may receive an RS block transmitted by Tx ant 8 at Bin 8, an RS block transmitted by Tx ant 9 at Bin 9, an RS symbol transmitted by Tx ant 10 at Bin 10, and an RS symbol transmitted by Tx ant 11 at Bin 11.

In some aspects, as shown in FIG. 5, the patterns observed during Interval 0, Interval 1, and Interval 2 may repeat during Interval 3, Interval 4, and Interval 5, respectively. Also, the patterns observed during Interval 0, Interval 1, and Interval 2 may repeat during Interval 6, Interval 7, and Interval 8, respectively. Again, the patterns observed during Interval 0, Interval 1, and Interval 2 made repeat during Interval 9, Interval 10, and Interval 11, respectively.

As discussed above with respect to FIG. 3, the RS block may include encoded beam pairing information. In some aspects, each received RS block symbol may include beam pairing information associated with a transmit antenna. For instance, the RS block symbol received during Interval 0 at bin 0 may include beam pairing information associated with Tx ant 0, the RS block symbol received during Interval 1 at Bin 0 may include beam pairing information associated with Tx ant 4, the RS block symbol received during Interval 2 at Bin 0 may include beam pairing information associated with Tx ant 8, and so on.

In some aspects, the UE 120 may analyze the beam pairing information included in each of the received RS block symbols with respect to each receive antenna (e.g., Rx ant 0, ..., Rx ant 3). Based at least in part on a result of the analysis, the UE 120 may estimate a pairing of reception beams associated with each receive antenna (e.g., Rx ant 0, ..., through Rx ant 3) with a transmission beam associated with a transmit antenna. For instance, based at least in part on a result of an analysis of beam pairing information included in the RS block symbol received during Interval 2 at Bin 5, the UE 120 may estimate a pairing of reception beams associated with each receive antenna with a transmission beam used by Tx ant 9 to transmit the RS block symbol received during Interval 2 at Bin 5. Similarly, based at least in part on a result of an analysis of beam pairing information included in the RS block symbol received during Interval 7 at Bin 11, the UE 120 may estimate a pairing of reception beams associated with each receive antenna with a transmission beam used by Tx ant 7 to transmit the RS block symbol received during Interval 7 at Bin 11, and so on.

The beam pairing information included in the RS block symbols allows the UE 120 to estimate multiple beam pairs by pairing of multiple reception beams with multiple transmission beams. The UE 120 may select a given beam pair, from among the multiple beam pairs, to receive the payload data. In some aspects, selection of the given beam pair may be based at least in part on one or more factors including, for example, a high received signal strength indicator (RSSI) value, a high reference signal receive power (RSRP) value, a low signal-to-noise ratio (SNR), and/or the like. Fee the UE 120 may select a beam pair associated with a highest RSRP, a highest RSSI, or a lowest SNR, for the given beam pair. In some aspects, the UE 120 may determine the transmit antenna associated with the given beam pair as an active antenna, and may perform at least one subsequent channel estimation operation based at least in part on a transmission received from the active antenna.

In some aspects, selection of the given beam pair based at least in part on the above one or more factors may improve a quality of the data communication. In this way, operation of the wireless network is improved.

As indicated above, FIG. 5 is provided as an example. Other examples may differ from what is described with regard to FIG. 5.

Figure 6:
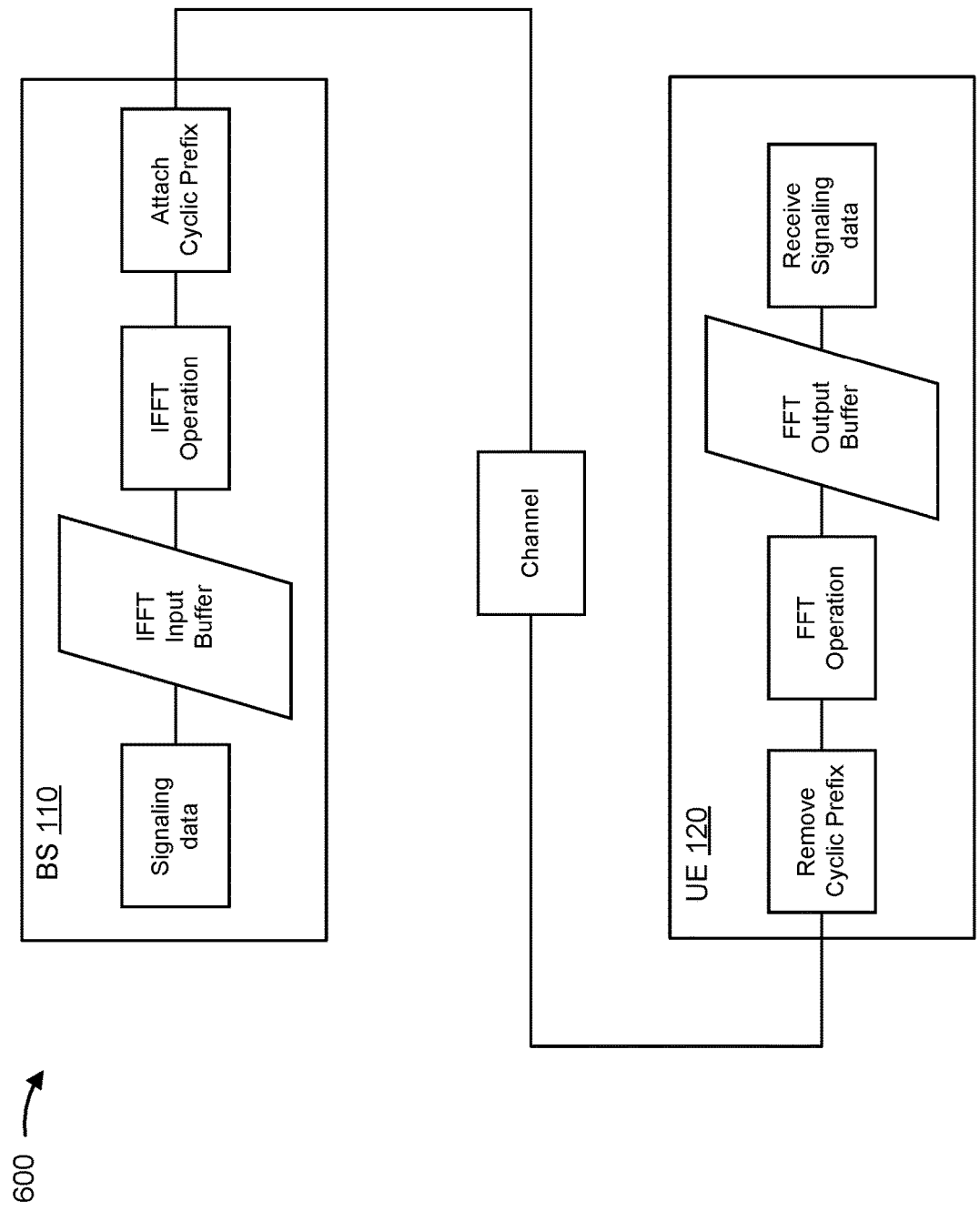
FIG. 6 is a diagram illustrating an example of data communication utilizing an OFDM reference signal block, in accordance with various aspects of the present disclosure.

FIG. 6 is a diagram illustrating an example of data communication utilizing an OFDM reference signal block, in accordance with various aspects of the present disclosure. A BS 110 and a UE 120 may conduct data communication, in a wireless network, by transmitting and/or receiving signaling data and/or payload data. In some aspects, the BS 110 may transmit, and the UE 120 may receive, the signaling data utilizing a frequency-domain reference signal block (RS block) and/or the payload data utilizing a single carrier waveform. In some aspects, the UE 120 may receive the RS block periodically (e.g., once within a periodic interval of time). The RS block may include, for example, one or more RS blocks discussed elsewhere herein, such as the RS block discussed above with respect to FIG. 3, the RS block discussed above with respect to FIG. 4, and/or the RS block discussed above with respect to FIG. 5.

As shown in FIG. 6, the BS 110 may process signaling data, to be transmitted to the UE 120, by inputting the signaling data into an inverse Fast-Fourier transform (IFFT) input buffer. An IFFT operation may be performed on the output of the IFFT input buffer to provide the RS block. The BS 110 may attach a cyclic prefix to the RS block and transmit the RS block over a channel to the UE 120. Upon reception of the RS block, the UE 120 may remove the cyclic prefix attached to the RS block, perform a Fast-Fourier Transform (FFT) operation on the RS block, and provide an output of the FFT operation to an FFT output buffer to receive the signaling data.

In some aspects, the channel may introduce inter-symbol interference (ISI) to a transmission of the RS block resulting in ISI potentially being observed at the UE 120. The cyclic prefix may serve as a guard interval to alleviate potential ISI observed at the UE 120, thereby simplifying reception of the RS block at the UE 120 and allowing efficient performance of channel estimation and beam pairing operations. A cyclic prefix is a prefix of a symbol that is a repetition of the end of the symbol.

In some aspects, a cyclic prefix length (CP length) of the cyclic prefix attached to the frequency-domain RS block may be shorter than a CP length of a cyclic prefix attached to frequency-domain signals used for communications in the FR1 and/or FR2 frequency ranges of a 5G network. As just one example, the CP length for the frequency-domain RS block may be approximately 1-2%, whereas a CP length for FR1 and/or FR2 may be approximately 7%. A shorter CP length may allow inclusion of, for example, more payload data, thereby increasing an amount of throughput enabled by the UE 120. In some aspects, the shorter CP length may allow a flexibility in designing a subcarrier spacing (SCS) associated with the RS block. In some aspects, the cyclic prefix may enable the UE 120 to receive the RS block without degradation.

In this way, by utilizing the cyclic prefix to generate and receive the RS block, and the included signaling data, operation of the wireless network may be improved.

As indicated above, FIG. 6 is provided as an example. Other examples may differ from what is described with regard to FIG. 6.

Figure 7:
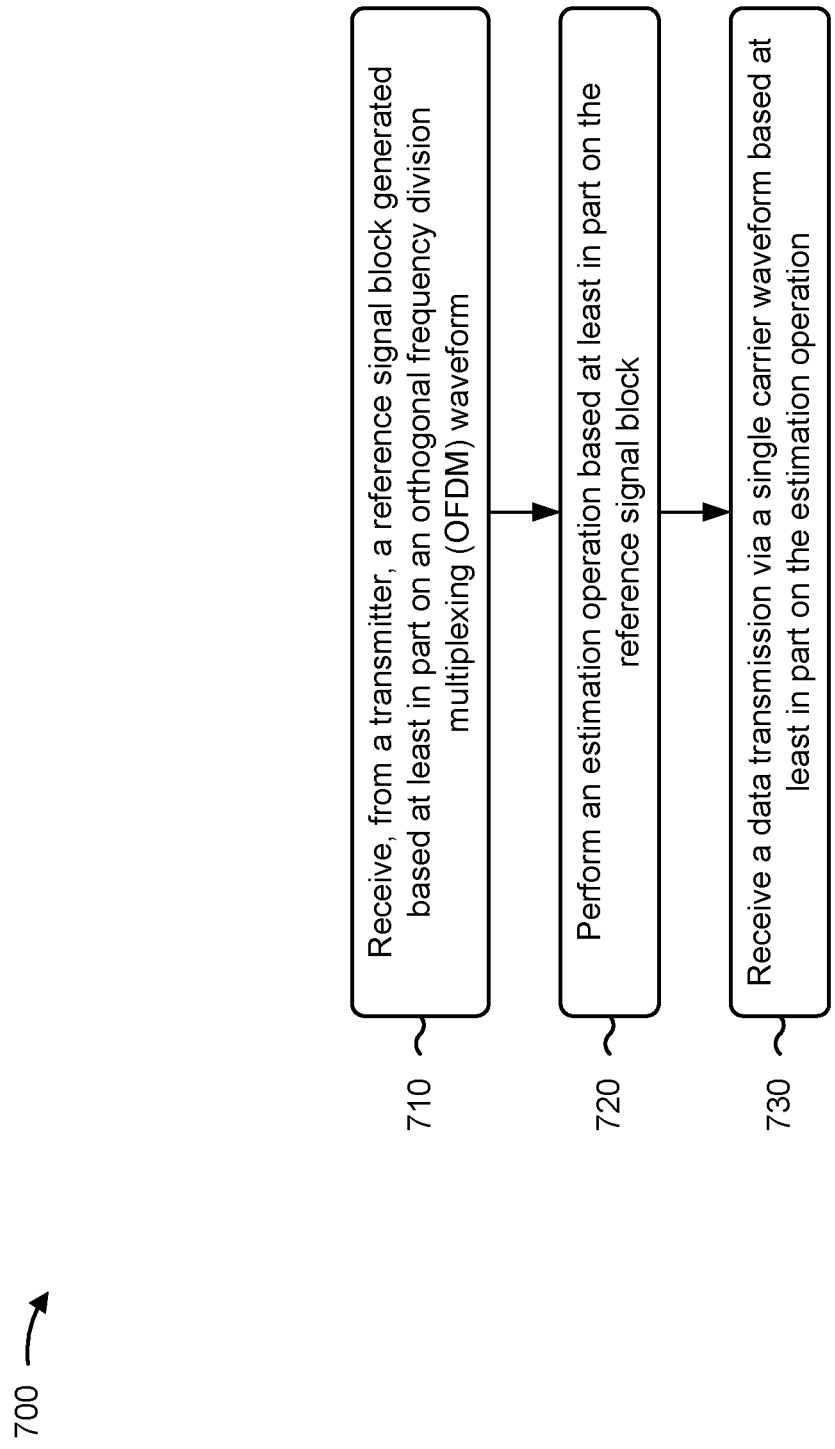
FIG. 7 is a diagram illustrating an example process associated with data communication utilizing an OFDM reference signal block, in accordance with various aspects of the present disclosure.

FIG. 7 is a diagram illustrating an example process 700 associated with data communication utilizing an OFDM reference signal block, in accordance with various aspects of the present disclosure. In some aspects, example process 700 may be performed, for example, by a user equipment (UE) (e.g., UE 120), in accordance with various aspects of the present disclosure. Example process 700 is an example where the UE performs operations associated with providing a frequency-domain reference signal block with a time-domain single carrier waveform.

As shown in FIG. 7, in some aspects, process 700 may include receiving, from a transmitter, a reference signal block provided based at least in part on an orthogonal frequency division multiplexing (OFDM) waveform (block 710). For example, the UE (e.g., using reception component 902, depicted in FIG. 9) may receive, from a transmitter, a reference signal block provided based at least in part on an OFDM waveform, as described above.

As further shown in FIG. 7, in some aspects, process 700 may include performing an estimation operation based at least in part on the reference signal block (block 720). For example, the UE (e.g., using estimation component 908, depicted in FIG. 9) may perform an estimation operation based at least in part on the reference signal block, as described above.

As further shown in FIG. 7, in some aspects, process 700 may include receiving a data transmission via a single carrier waveform based at least in part on the estimation operation (block 730). For example, the UE (e.g., using reception component 902, depicted in FIG. 9) may receive a data transmission via a single carrier waveform based at least in part on the estimation operation, as described above.

Process 700 may include additional aspects, such as any single aspect or any combination of aspects described below and/or in connection with one or more other processes described elsewhere herein.

In a first aspect, the reference signal block comprises a plurality of reference signals in a plurality of corresponding resource elements.

In a second aspect, alone or in combination with the first aspect, the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

In a third aspect, alone or in combination with one or more of the first and second aspects, the first set of transmit antennas and the second set of transmit antennas are exclusive of each other.

In a fourth aspect, alone or in combination with one or more of the first through third aspects, the first set of reference signals as transmitted via the first set of transmit antennas is repeated in two or more symbols within a time period, and wherein the second set of reference signals as transmitted via the second set of transmit antennas is repeated in two or more symbols within the time period. For example, the time period may be a slot, or may be a length of the reference signal block.

In a fifth aspect, alone or in combination with one or more of the first through fourth aspects, the data transmission includes one or more data channels that are received in a symbol of a time period that is not used for the reference signal block. For example, the time period may be a slot.

In a sixth aspect, alone or in combination with one or more of the first through fifth aspects, the data transmission includes one or more reference signals that are received in a symbol of a time period that is not used for the reference signal block. For example, the time period may be a slot.

In a seventh aspect, alone or in combination with one or more of the first through sixth aspects, each symbol of the reference signal block includes a reference signal transmitted via an active transmit antenna of the transmitter.

In an eighth aspect, alone or in combination with one or more of the first through seventh aspects, the first set of reference signals as transmitted via the first set of transmit antennas is repeated in two or more frequency bins within the first symbol. "Frequency bins" are sometimes referred to herein as "bins."

In a ninth aspect, alone or in combination with one or more of the first through eighth aspects, performing the estimation operation further comprises performing the estimation operation for each combination of a transmit antenna, of the first set of transmit antennas and the second set of transmit antennas, and a receive antenna, of a plurality of receive antennas of the UE.

In a tenth aspect, alone or in combination with one or more of the first through ninth aspects, the reference signal block is associated with a cyclic prefix.

In an eleventh aspect, alone or in combination with one or more of the first through tenth aspects, process 700 includes receiving configuration information indicating a configuration for the reference signal block, wherein the estimation operation is based at least in part on the configuration information.

In a twelfth aspect, alone or in combination with one or more of the first through eleventh aspects, the configuration information indicates a numerology for the reference signal block.

In a thirteenth aspect, alone or in combination with one or more of the first through twelfth aspects, the reference signal block, in a slot, is defined based at least in part on a frequency bin index, a root sequence, and a slot index of the slot.

In a fourteenth aspect, alone or in combination with one or more of the first through thirteenth aspects, the reference signal block is defined, in a slot and for a transmit antenna t at a frequency bin k, as $p\_t(k)=1/\sqrt{2}((1-2c\_t(2k))+j(1-2c\_t(2k+1)))$, wherein $p\_t(k)$ is a reference signal block symbol for the transmit antenna t at the frequency bin k, $c\_t(k)$ is a root sequence for the transmit antenna t that is provided using an initialization that is defined by $c\_init$ (t, N_slot), and N_slot is a slot index of the slot.

In a fifteenth aspect, alone or in combination with one or more of the first through fourteenth aspects, the estimation operation comprises at least one of channeling estimation, timing estimation, noising covariance estimation, frequency domain residual sideband estimation, coursing frequency offset estimation, beam selection, rotation matrix estimation, or analog to digital (analog/digital) dynamic level estimation.

In a sixteenth aspect, alone or in combination with one or more of the first through fifteenth aspects, the reference signal block is received in accordance with a periodicity.

In a seventeenth aspect, alone or in combination with one or more of the first through sixteenth aspects, the reference signal block is associated with a downlink/uplink switching gap. Additionally, or alternatively, the reference signal block may be associated with an uplink/downlink switching gap.

In an eighteenth aspect, alone or in combination with one or more of the first through seventeenth aspects, the reference signal block comprises a synchronization signal block.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
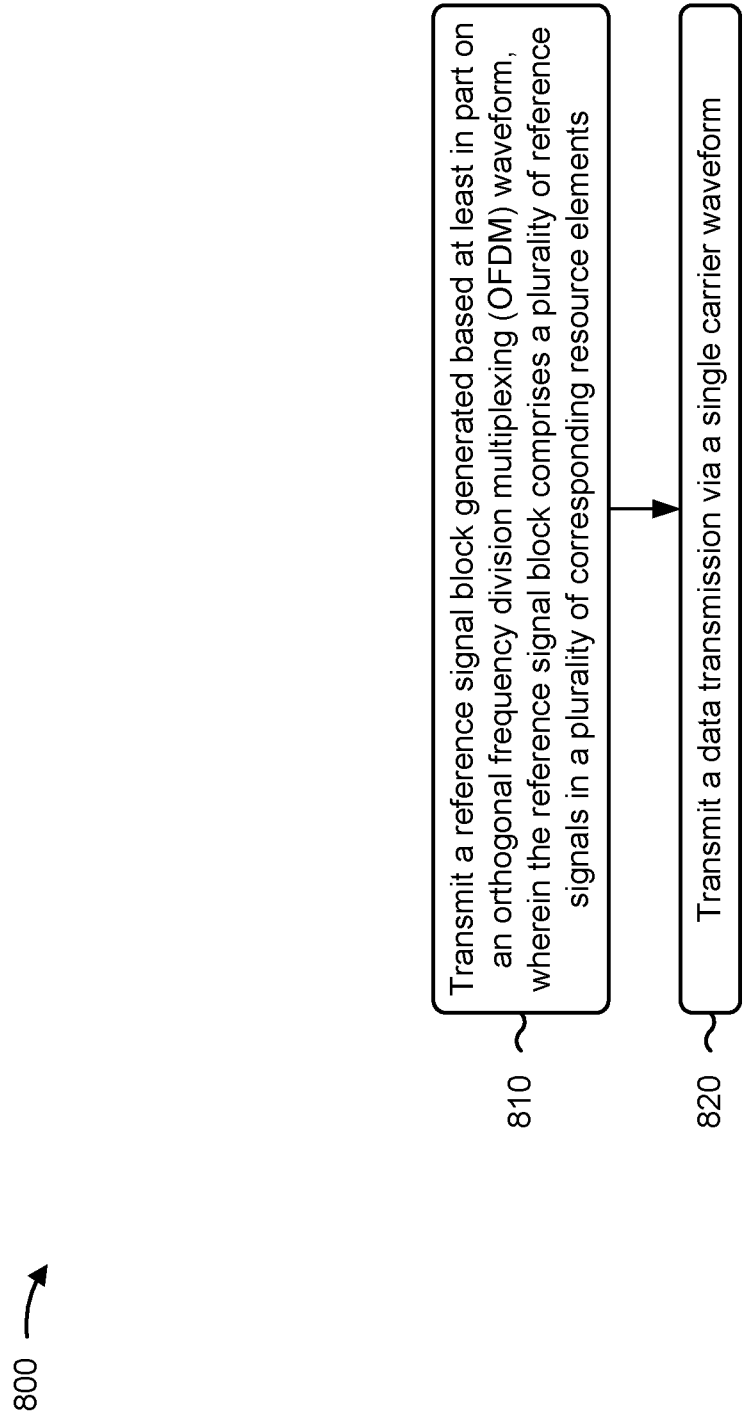
FIG. 8 is a diagram illustrating an example process associated with data communication utilizing an OFDM reference signal block, in accordance with various aspects of the present disclosure.

FIG. 8 is a diagram illustrating an example process 800 associated with data communication utilizing an OFDM reference signal block, in accordance with various aspects of the present disclosure. In some aspects, example process 800 may be performed, for example, by a transmitter (e.g., BS 110), in accordance with various aspects of the present disclosure. Example process 800 is an example where the transmitter performs operations associated with providing a frequency-domain reference signal block with a time-domain single carrier waveform.

As shown in FIG. 8, in some aspects, process 800 may include transmitting a reference signal block provided based at least in part on an orthogonal frequency division multiplexing (OFDM) waveform, wherein the reference signal block comprises a plurality of reference signals in a plurality of corresponding resource elements (block 810). For example, the transmitter (e.g., using transmission component 1004, depicted in FIG. 10) may transmit a reference signal block provided based at least in part on an OFDM waveform, wherein the reference signal block comprises a plurality of reference signals in a plurality of corresponding resource elements, as described above.

As further shown in FIG. 8, in some aspects, process 800 may include transmitting a data transmission via a single carrier waveform (block 820). For example, the transmitter (e.g., using transmission component 1004, depicted in FIG. 10) may transmit a data transmission via a single carrier waveform, as described above.

Process 800 may include additional aspects, such as any single aspect or any combination of aspects described below and/or in connection with one or more other processes described elsewhere herein.

In a first aspect, the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

In a second aspect, alone or in combination with the first aspect, the first set of transmit antennas and the second set of transmit antennas are exclusive of each other.

In a third aspect, alone or in combination with one or more of the first and second aspects, the first set of reference signals as transmitted via the first set of transmit antennas is repeated in two or more symbols within a time period, and wherein the second set of reference signals as transmitted via the second set of transmit antennas is repeated in two or more symbols within the time period.

In a fourth aspect, alone or in combination with one or more of the first through third aspects, the data transmission includes one or more data channels that are transmitted in a symbol of a time period that is not used for the reference signal block.

In a fifth aspect, alone or in combination with one or more of the first through fourth aspects, the data transmission includes one or more reference signals that are received in a symbol of a time period that is not used for the reference signal block.

In a sixth aspect, alone or in combination with one or more of the first through fifth aspects, each symbol of the reference signal block includes a reference signal transmitted via an active transmit antenna of the transmitter.

In a seventh aspect, alone or in combination with one or more of the first through sixth aspects, the first set of reference signals as transmitted via the first set of transmit antennas is repeated in two or more frequency bins within the first symbol.

In an eighth aspect, alone or in combination with one or more of the first through seventh aspects, the reference signal block is provided with a cyclic prefix.

In a ninth aspect, alone or in combination with one or more of the first through eighth aspects, process 800 includes transmitting configuration information indicating a configuration for the reference signal block.

In a tenth aspect, alone or in combination with one or more of the first through ninth aspects, the configuration information indicates a numerology for the reference signal block.

In an eleventh aspect, alone or in combination with one or more of the first through tenth aspects, the reference signal block, in a slot, is defined based at least in part on a frequency bin index, a root sequence, and a slot index of the slot.

In a twelfth aspect, alone or in combination with one or more of the first through eleventh aspects, the reference signal block is defined, in a slot and for a transmit antenna t at a frequency bin k, as $p\_t(k)=1/\sqrt{2}((1-2c\_t(2k))+j(1-2c\_t$ (2k+1))), wherein p_t(k) is a reference symbol index of the transmit antenna t at the frequency bin k, c_t(k) is a sequence for the transmit antenna t that is provided using an initialization that is defined by c_init(t, N_slot), and N_slot is a slot index of the slot.

In a thirteenth aspect, alone or in combination with one or more of the first through twelfth aspects, the reference signal block is associated with an estimation operation comprising at least one of channeling estimation, timing estimation, noise covariance estimation, frequency domain residual sideband estimation, course frequency offset estimation, beam selection, rotation matrix estimation, or analog/digital dynamic level estimation.

In a fourteenth aspect, alone or in combination with one or more of the first through thirteenth aspects, the reference signal block is transmitted in accordance with a periodicity.

In a fifteenth aspect, alone or in combination with one or more of the first through fourteenth aspects, the reference signal block is associated with a downlink/uplink switching gap.

In a sixteenth aspect, alone or in combination with one or more of the first through fifteenth aspects, the reference signal block comprises a synchronization signal block.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
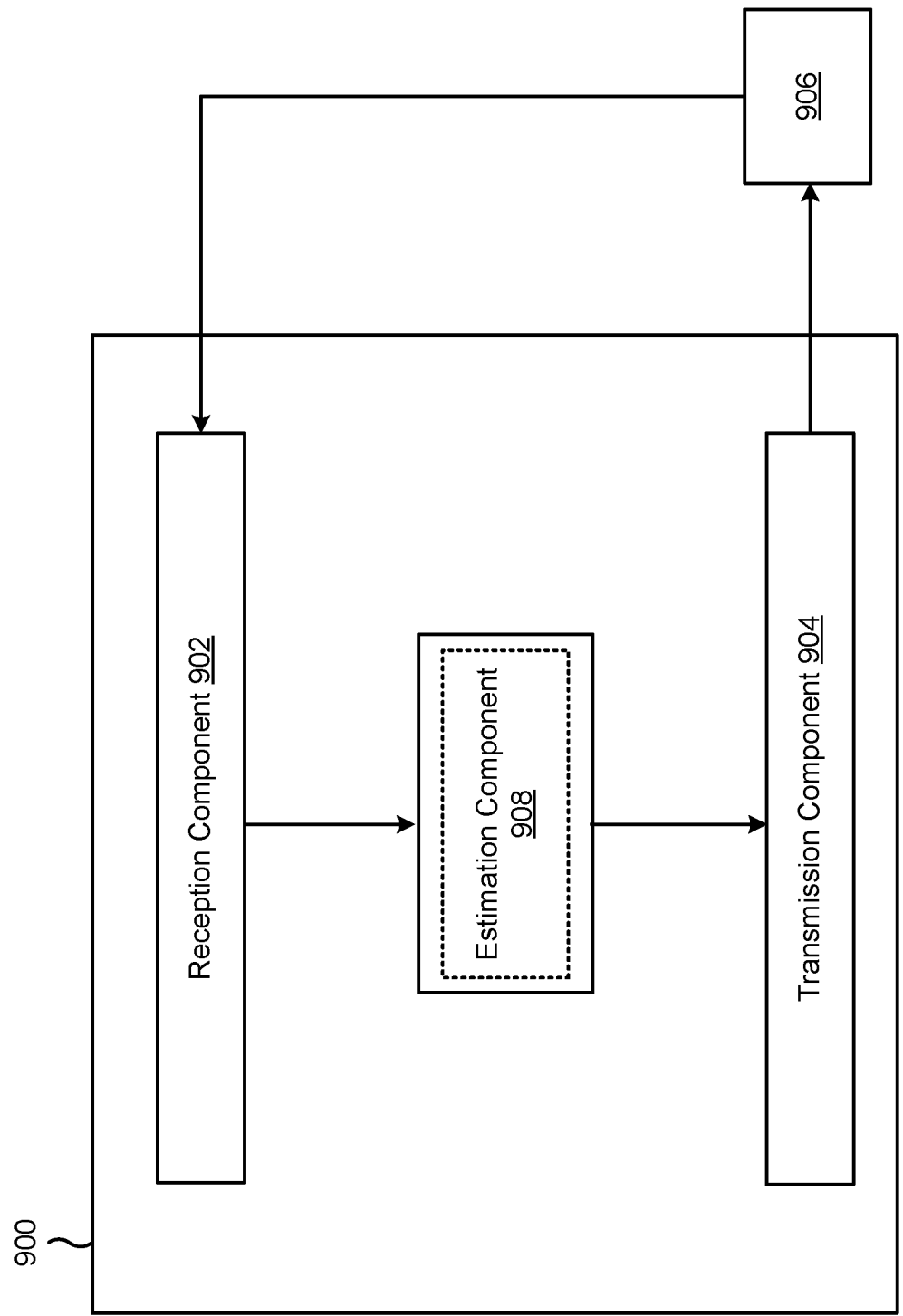
FIGS. 9 and 10 are block diagrams of example apparatuses associated with data communication utilizing an OFDM reference signal block, in accordance with various aspects of the present disclosure.

FIG. 9 is a block diagram of an example apparatus 900 associated with data communication utilizing an OFDM reference signal block, in accordance with various aspects of the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of an estimation component 908, among other examples.

In some aspects, the apparatus 900 may be configured to perform one or more operations described herein in connection with FIGS. 3-6. Additionally or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The reception component 902 may receive, from a transmitter, a reference signal block provided based at least in part on an orthogonal frequency division multiplexing (OFDM) waveform. The estimation component 908 may perform an estimation operation based at least in part on the reference signal block. In some aspects, the estimation component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The reception component 902 may receive a data transmission via a single carrier waveform based at least in part on the estimation operation.

The reception component 902 may receive configuration information indicating a configuration for the reference signal block, wherein the estimation operation is based at least in part on the configuration information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
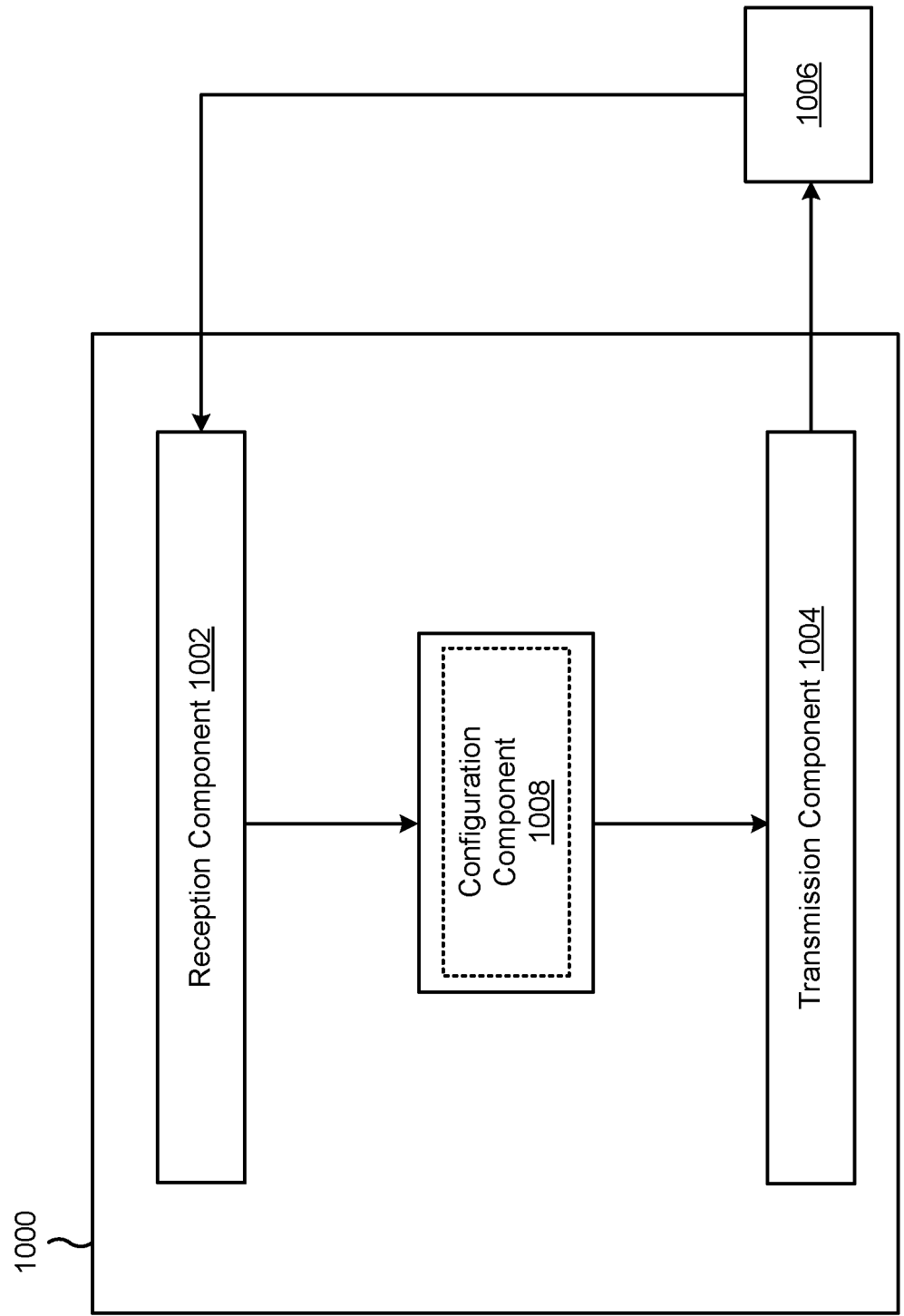

FIG. 10 is a block diagram of an example apparatus 1000 associated with data communication utilizing an OFDM reference signal block, in accordance with various aspects of the present disclosure. The apparatus 1000 may be a transmitter, or a transmitter may include the apparatus 1000. In some aspects, the apparatus 1000 (e.g., BS 110) includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a configuration component 1008, among other examples. In some aspects, the configuration component 1008 may provide a configuration for an OFDM reference signal block. In some aspects, the configuration component 1008 may include one or more antennas, a demodulator, a MIMO detector, a receive processor, a modulator, a transmit MIMO processor, a transmit processor, a controller/processor, a memory, or a combination thereof, of the BS described above in connection with FIG. 2.

In some aspects, the apparatus 1000 may be configured to perform one or more operations described herein in connection with FIGS. 3-6. Additionally or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the transmitter described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the transmitter described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the transmitter described above in connection with FIG. 2. In some aspects, the transmission component 1004 may be collocated with the reception component 1002 in a transceiver.

The transmission component 1004 may transmit a reference signal block provided based at least in part on an orthogonal frequency division multiplexing (OFDM) waveform, wherein the reference signal block comprises a plurality of reference signals in a plurality of corresponding resource elements. The transmission component 1004 may transmit a data transmission via a single carrier waveform.

The transmission component 1004 may transmit configuration information indicating a configuration for the reference signal block.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a user equipment (UE), comprising: receiving, from a transmitter, a reference signal block provided based at least in part on an orthogonal frequency division multiplexing (OFDM) waveform; performing an estimation operation based at least in part on the reference signal block; and receiving a data transmission via a single carrier waveform based at least in part on the estimation operation.

Aspect 2: The method of aspect 1, wherein the reference signal block comprises a plurality of reference signals in a plurality of corresponding resource elements.

Aspect 3: The method of any of aspects 1-2, wherein the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

Aspect 4: The method of any of aspects 1-3, wherein the first set of reference signals as transmitted via the first set of transmit antennas is repeated in two or more symbols within a time period, and wherein the second set of reference signals as transmitted via the second set of transmit antennas is repeated in two or more symbols within the time period.

Aspect 5: The method of any of aspects 1-4, wherein the data transmission includes one or more data channels that are received in a symbol of a time period that is not used for the reference signal block.

Aspect 6: An apparatus for wireless communication at a device, comprising a processor; memory coupled with the processor; and instructions stored in the memory and executable by the processor to cause the apparatus to perform the method of one or more aspects of aspects 1-5.

Aspect 7: A device for wireless communication, comprising a memory and one or more processors coupled to the memory, the memory and the one or more processors configured to perform the method of one or more aspects of aspects 1-5.

Aspect 8: An apparatus for wireless communication, comprising at least one means for performing the method of one or more aspects of aspects 1-5.

Aspect 9: A non-transitory computer-readable medium storing code for wireless communication, the code comprising instructions executable by a processor to perform the method of one or more aspects of aspects 1-5.

Aspect 10: A non-transitory computer-readable medium storing a set of instructions for wireless communication, the set of instructions comprising one or more instructions that, when executed by one or more processors of a device, cause the device to perform the method of one or more aspects of aspects 1-5.

Aspect 11: A method of wireless communication performed by a transmitter, comprising: transmitting a reference signal block provided based at least in part on an orthogonal frequency division multiplexing (OFDM) waveform, wherein the reference signal block comprises a plurality of reference signals in a plurality of corresponding resource elements; and transmitting a data transmission via a single carrier waveform.

Aspect 12: The method of aspect 11, wherein the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

Aspect 13: The method of any of aspects 11-12, wherein the first set of reference signals as transmitted via the first set of transmit antennas is repeated in two or more symbols within a time period, and wherein the second set of reference signals as transmitted via the second set of transmit antennas is repeated in two or more symbols within the time period.

Aspect 14: The method of any of aspects 11-13, wherein the data transmission includes one or more data channels that are transmitted in a symbol of a time period that is not used for the reference signal block.

Aspect 15: The method of any of aspects 11-14, wherein the data transmission includes one or more reference signals that are received in a symbol of a time period that is not used for the reference signal block.

Aspect 16: An apparatus for wireless communication at a device, comprising a processor; memory coupled with the processor; and instructions stored in the memory and executable by the processor to cause the apparatus to perform the method of one or more aspects of aspects 11-15.

Aspect 17: A device for wireless communication, comprising a memory and one or more processors coupled to the memory, the memory and the one or more processors configured to perform the method of one or more aspects of aspects 11-15.

Aspect 18: An apparatus for wireless communication, comprising at least one means for performing the method of one or more aspects of aspects 11-15.

Aspect 19: A non-transitory computer-readable medium storing code for wireless communication, the code comprising instructions executable by a processor to perform the method of one or more aspects of aspects 11-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 11-15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive, from a transmitter and in a slot, a reference signal block provided utilizing an orthogonal frequency division multiplexing (OFDM) waveform and including signaling data to estimate one or more parameters used to receive a data transmission communicated via a single carrier waveform;
perform an estimation operation, based at least in part on the reference signal block, to estimate the one or more parameters used to receive the data transmission communicated via the single carrier waveform; and
receive, in the slot, the data transmission via the single carrier waveform based at least in part on the one or more parameters estimated via the estimation operation.

2. The UE of claim 1, wherein the reference signal block comprises a plurality of reference signals in a plurality of corresponding resource elements.

3. The UE of claim 1, wherein the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

4. The UE of claim 3, wherein the first set of transmit antennas and the second set of transmit antennas are exclusive of each other.

5. The UE of claim 3, wherein the first set of reference signals as transmitted via the first set of transmit antennas is repeated in two or more symbols within a time period, and wherein the second set of reference signals as transmitted via the second set of transmit antennas is repeated in two or more symbols within the time period.

6. The UE of claim 5, wherein the data transmission includes one or more data channels that are received in a symbol of a time period that is not used for the reference signal block.

7. The UE of claim 5, wherein the data transmission includes one or more reference signals that are received in a symbol of a time period that is not used for the reference signal block.

8. The UE of claim 5, wherein each symbol of the reference signal block includes a reference signal transmitted via an active transmit antenna of the transmitter.

9. The UE of claim 3, wherein the first set of reference signals as transmitted via the first set of transmit antennas is repeated in two or more frequency bins within the first symbol.

10. The UE of claim 3, wherein the one or more processors, when performing the estimation operation, are configured to:
perform the estimation operation for each combination of a transmit antenna, of the first set of transmit antennas and the second set of transmit antennas, and a receive antenna, of a plurality of receive antennas of the UE.

11. A transmitter for wireless communication, comprising:
one or more memories; and
one or more processors, coupled to the one or more memories, configured to:
transmit, in a slot, a reference signal block provided utilizing an orthogonal frequency division multiplexing (OFDM) waveform and including signaling data to estimate one or more parameters used to receive a data transmission communicated via a single carrier waveform, the reference signal block for performing an estimation operation to estimate the one or more parameters used to receive the data transmission communicated via the single carrier waveform, wherein the reference signal block comprises a plurality of reference signals in a plurality of corresponding resource elements; and
transmit, in the slot, the data transmission via the single carrier waveform.

12. The transmitter of claim 11, wherein the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

13. The transmitter of claim 12, wherein the first set of transmit antennas and the second set of transmit antennas are exclusive of each other.

14. The transmitter of claim 12, wherein the first set of reference signals as transmitted via the first set of transmit antennas is repeated in two or more symbols within a time period, and wherein the second set of reference signals as transmitted via the second set of transmit antennas is repeated in two or more symbols within the time period.

15. The transmitter of claim 14, wherein the data transmission includes one or more data channels that are transmitted in a symbol of a time period that is not used for the reference signal block.

16. The transmitter of claim 14, wherein the data transmission includes one or more reference signals that are received in a symbol of a time period that is not used for the reference signal block.

17. The transmitter of claim 14, wherein each symbol of the reference signal block includes a reference signal transmitted via an active transmit antenna of the transmitter.

18. The transmitter of claim 12, wherein the first set of reference signals as transmitted via the first set of transmit antennas is repeated in two or more frequency bins within the first symbol.

19. The transmitter of claim 11, wherein the reference signal block is provided with a cyclic prefix.

20. The transmitter of claim 11, wherein the one or more processors are further configured to:
transmit configuration information indicating a configuration for the reference signal block.

21. A method of wireless communication performed by a user equipment (UE), comprising:
receiving, from a transmitter and in a slot, a reference signal block provided utilizing an orthogonal frequency division multiplexing (OFDM) waveform and including signaling data to estimate one or more parameters used to receive a data transmission communicated via a single carrier waveform;
performing an estimation operation, based at least in part on the reference signal block, to estimate the one or more parameters used to receive the data transmission communicated via the single carrier waveform; and
receiving, in the slot, the data transmission via the single carrier waveform based at least in part on the one or more parameters estimated via the estimation operation.

22. The method of claim 21, wherein the reference signal block comprises a plurality of reference signals in a plurality of corresponding resource elements.

23. The method of claim 21, wherein the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

24. The method of claim 23, wherein the first set of reference signals as transmitted via the first set of transmit antennas is repeated in two or more symbols within a time period, and wherein the second set of reference signals as transmitted via the second set of transmit antennas is repeated in two or more symbols within the time period.

25. The method of claim 24, wherein the data transmission includes one or more data channels that are received in a symbol of a time period that is not used for the reference signal block.

26. A method of wireless communication performed by a transmitter, comprising:
    transmitting, in a slot, a reference signal block provided utilizing an orthogonal frequency division multiplexing (OFDM) waveform and including signaling data to estimate one or more parameters used to receive a data transmission communicated via a single carrier waveform, the reference signal block for performing an estimation operation to estimate the one or more parameters used to receive the data transmission communicated via the single carrier waveform, wherein the reference signal block comprises a plurality of reference signals in a plurality of corresponding resource elements; and
    transmitting, in the slot, the data transmission via the single carrier waveform.

27. The method of claim 26, wherein the reference signal block includes a first set of reference signals and a second set of reference signals, wherein the first set of reference signals is transmitted via a first set of transmit antennas in a first symbol and the second set of reference signals is transmitted via a second set of transmit antennas in a second symbol.

28. The method of claim 27, wherein the first set of reference signals as transmitted via the first set of transmit antennas is repeated in two or more symbols within a time period, and wherein the second set of reference signals as transmitted via the second set of transmit antennas is repeated in two or more symbols within the time period.

29. The method of claim 28, wherein the data transmission includes one or more data channels that are transmitted in a symbol of a time period that is not used for the reference signal block.

30. The method of claim 28, wherein the data transmission includes one or more reference signals that are received in a symbol of a time period that is not used for the reference signal block.

* * * * *